United States Patent [19]

Harris, Jr.

[11] Patent Number: 4,739,021

[45] Date of Patent: Apr. 19, 1988

[54] UNSATURATED SILYLATED VINYL ALCOHOL POLYMERS

[75] Inventor: John F. Harris, Jr., Wilmington, Del.

[73] Assignee: E. I. Du Pont de Nemours and Company, Wilmington, Del.

[21] Appl. No.: 861,878

[22] Filed: May 12, 1986

[51] Int. Cl.[4] .............................. C08F 4/16; C08F 4/44; C08F 122/04

[52] U.S. Cl. .................................. 526/90; 526/173; 526/194; 526/209; 526/210; 526/213; 526/217; 526/225; 526/226; 526/279

[58] Field of Search .............. 526/208, 279, 237, 173, 526/190, 210, 209, 213, 217, 194, 225, 226; 525/338, 326.5, 344, 355, 339, 379

[56] References Cited

U.S. PATENT DOCUMENTS

| | | | |
|---|---|---|---|
| 1,963,108 | 6/1934 | Werntz | 260/2 |
| 2,165,962 | 7/1939 | Mueller-Cunradi et al. | 260/615 |
| 2,532,583 | 9/1945 | Tyran | 526/279 |
| 3,418,293 | 12/1968 | Bolchert | 260/80 |
| 3,458,491 | 7/1969 | Dennis | 269/94.2 |
| 3,472,888 | 10/1969 | Bazoula et al. | 260/448.8 |
| 3,491,068 | 1/1970 | Gaylord | 260/78.5 |
| 3,993,847 | 11/1976 | Kondo | 428/451 |
| 4,381,377 | 4/1983 | Kampf et al. | 525/375 |
| 4,396,751 | 8/1983 | Kampf et al. | 526/279 |
| 4,510,293 | 4/1985 | Kubo et al. | 525/338 |
| 4,544,724 | 10/1985 | Sogah et al. | 526/279 |

FOREIGN PATENT DOCUMENTS 44-2229 9/1969 Japan.

285238-S 1/1984 U.S.S.R..

OTHER PUBLICATIONS

Chem. Abstract, vol. 76, 1972, entry 15507–Vysokomolek, Soed (USSP) vol. 15, No. 8, 1971, pp. 1857–1862.
Brun et al., Tetrahedron Lett., 24(4):385 (1983).
Makin et al., Kh. Org. Khim., 18(2):287 (1982) (Abstract).
Jung et al., Tetrahedron Lett., 3791 (1977).
Mukaiyama et al., Chem. Lett., 4:319 (1975).
Makin et al., Zh. Org. Khim., 19(11):2285 (1983) (Abstract).
Makarov et al., Vysokomol, Soedin, Ser. B., 13(3):222 (1971) (Abstract).
Murahashi et al., Polymer Letters, 3:245 (1965).
Murahashi et al., Polymer Letters, 4: 59, 65 and 187 (1966).
Nozakura et al., J. Polymer Sci., Polymer Chem. Ed., 11:1053 (1973).
Runge et al., Makromol, Che., 120:148 (1968).
"Silicon in Organic Synthesis", Butterworths, 1981, pp. 219–222, 227, 232–236, Author Colvin).
Hoaglin et al., J. Am. Chem. Soc., 71:3468 (1949).
Fishman et al., Synthesis Comm., 137 (1981).
Fleming et al., Tetrahedron Lett., 39(6):841–846 (1983).

*Primary Examiner*—Joseph L. Schofer
*Assistant Examiner*—Peter F. Kulkosky

[57] ABSTRACT

Unsaturated silylated vinyl alcohol polymers, derivatives thereof, and processes for their preparation.

18 Claims, No Drawings

UNSATURATED SILYLATED VINYL ALCOHOL POLYMERS

BACKGROUND OF THE INVENTION

1. Field of the Invention

This invention relates to unsaturated silylated vinyl alcohol polymers, that is, polymers of conjugated polyenyloxysilanes and copolymers thereof with ethenyloxysilanes, and to their preparation.

2. Background (1,3-Butadienyloxy)trialkylsilanes are known compounds or are prepared by known methods. For example, U.S. Pat. No. 3,472,888 discloses the preparation of (1,3-butadienyloxy)trihydrocarbylsilanes. Brun et al., *Tetrahedron Lett.*, 24(4): 385 (1983) disclose (1,3-butadienyloxy)trimethylsilane and 1,3-butadienenyacetate. Makin et al., *Kh. Org. Khim.*, 18(2): 287 (1982) disclose the preparation of (1,3-butadienyloxy)trimethylsilanes by silylating α,β-unsaturated aldehydes with trimethylsilyl chloride and triethylamine. Jung et al., *Tetrahedron Lett.*, 3791 (1977) disclose the preparation of ethenyloxysilanes from lithium enolates of aldehydes by reaction with trialkylsilyl chlorides.

Polymers prepared from (1,3-butadienyloxy)trialkylsilanes are also known. Mukaiyama et al., *Chem. Lett.*, 4: 319 (1975) disclose the formation of polymer in the titanium tetrachloride-catalyzed reaction of (1,3-butadienyloxy)trimethylsilane when methylene chloride or toluene were used as solvents. Polymer was not formed when a more strongly complexing solvent (THF) was employed or when titanium isopropoxide was added to the titanium tetrachloride. Makin et al., *Zh. Org. Khim.*, 19(11): 2285 (1983) disclose reaction of 1,3-butadienyloxytrimethylsilanes with acetals catalyzed by zinc chloride without polymerization. Makarov et al., *Vysokomol. Soedin. Ser. B*, 13(3): 222 (1971) disclose copolymerization of 1- and 2-acetoxy-1,3-butadiene with styrene and methyl methacrylate. USSR patent application No. 285,238-S discloses copolymerization of 1,3-butadienyltrialkylsilanes with various vinyl monomers including styrene and methyl methacrylate using free radical catalysts.

U.S. Pat. No. 3,491,068 discloses 1:1 alternating copolymers of maleic anhydride and diolefins, including 1- and 2-alkoxy-1,3-butadienes prepared by free radical polymerization. U.S. Pat. No. 3,458,491 discloses anionic (co)polymerization of various dienes, including 1- and 2-alkoxy-1,3-butadienes. The catalyst was an alkali metal alkyl or aryl or complexed alkali metal. U.S. Pat. No. 1,963,108 discloses the preparation of 1- and 2-acyloxy-1,3-butadienes and their free-radical polymerization. U.S. Pat. No. 3,993,847 discloses adhesives comprising copolymers of conjugated dienes including 1- and 2-alkoxy-1,3-butadienes. U.S. Pat. No. 3,418,293 discloses polymerization of vinyloxysilanes of the formula $CH_2=CHOSi(R^1)(R^2)(R^3)$ wherein $R^{1-3}$ are the same or different, and each is a hydrocarbon radical which can include alkyl, cycloalkyl, aryl, aralkyl, and alkaryl, in the presence of an ionic catalyst of the Friedel-Crafts or Ziegler type, at a temperature in the range $-80°$ C. to $0°$ C., in an anhydrous organic solvent. The product was a poly[(ethenyloxy)triorganosilane] which can be converted to poly(vinyl alcohol) by alcoholysis.

Murahashi et al., *Polymer Letters*, 3: 245 (1965) and 4: 59, 65 and 187 (1966), disclose the preparation of poly(vinyltrimethylsilyl ethers) by radical and cation-initiated polymerization of vinyloxy trimethylsilane and conversion thereof to stereoregular poly(vinyl alcohol). Also disclosed is the radical-initiated copolymerization of vinyloxy trimethylsilane ([ethenyloxy]trimethylsilane) with vinyl comonomers. Cationic initiators employed were $SnCl_4$ or ethyl aluminum chlorides. Nozakura et al., *J. Polymer Sci., Polymer Chem. Ed.*, 11: 1053 (1973), disclose the polymerization of several ethenyloxy trialkylsilanes initiated by cationic compounds $SnCl_4$ or ethyl aluminum chlorides, and conversion of the poly(vinyltrialkylsilyl ethers) to poly(vinyl alcohol) with aqueous hydrofluoric acid. Runge et al., *Makromol. Chem.*, 120: 148 (1968), disclose the free radical-initiated copolymerization of ethenyloxytrimethylsilane with vinyl comonomers. Japanese published, unexamined application No. JA 22299/69 discloses a process of copolymerizing ethenyloxytrialkylsilanes with vinyl comonomers in the presence of radical catalysts such as azo-bis(isobutyronitrile). Colvin, "Silicon in Organic Synthesis", Butterworths, 1981, pages 219–220, discloses the reaction of alicyclic silyl enol ethers with aldehydes in the presence of a fluoride ion catalyst, for example,

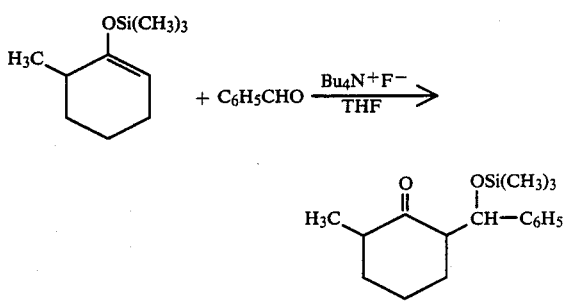

Colvin, ibid, page 227, discloses the reaction of aromatic aldehydes with silyl ketene acetals in the presence of $TiCl_4$; the silyl group in the product is subsequently removed by hydrolysis, for example,

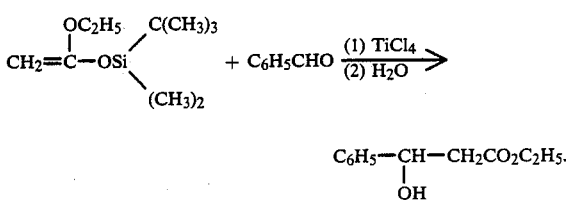

Colvin, ibid, pages 221 and 222, discloses the alkylation of silyl enol ethers with certain alkyl and aralkyl halides in the presence of $TiCl_4$ or $ZnBr_2$, for example,

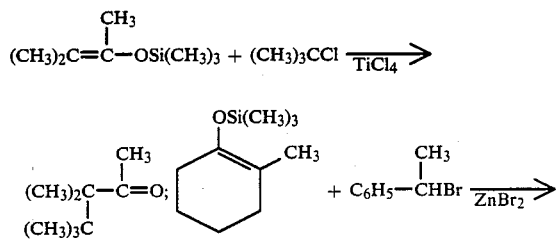

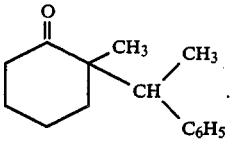

Colvin, ibid, pages 232-236, discloses the reaction of silyl enol ethers with acyl halides, halogenated acid anhydrides and ketones in the presence of Lewis acids.

U.S. Pat. No. 4,544,724 discloses the polymerization of ethenyloxysilanes initiated by aldehydes or precursors thereof, and catalyzed by selected Lewis acids, including zinc halides. The polymers are aldehyde-terminated poly(ethenyloxysilanes), hydrolyzable to poly(vinyl alcohol), and copolymers thereof.

The conversion of pendant siloxy groups, such as —OSi(CH$_3$)$_3$, to hydroxyl groups in polymers by a variety of methods is disclosed in the aforesaid publications of Murahashi and Colvin and in the Japanese publication.

U.S. Pat. No. 2,165,962 and Hoaglin et al., *J. Am. Chem. Soc.*, 71: 3468 (1949) describe the polymerization of alkyl vinyl ethers in the presence of acetals such as acetaldehyde acetal and a Lewis acid such as BF$_3$ to form acetal-capped polyvinyl ethers; for example,

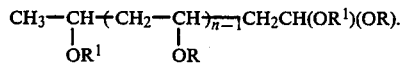

Acetal-initiated polymerization of trialkylsilylvinyl ethers is not disclosed. Formation of unsaturated aldehydes by hydrolysis of a 1,1,3 trialkoxy product formed by the condensation of an acetal with a vinyl ether is disclosed by Fishman et al., *Synthesis Comm.*, 137 (1981); for example,

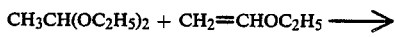

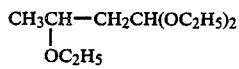

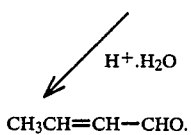

SUMMARY OF THE INVENTION

The present invention provides a polymer (1), and derivatives thereof, said polymer (1) consisting essentially of 2 to 100 mole percent of a first recurring unit of the formula

and 0 to 98 mole percent of a second recurring unit of the formula

wherein, $R^1$ is independently selected from the group consisting of alkyl radicals having 1 to 10 carbon atoms, alkenyl radicals having 2 or 4–10 carbon atoms, and aryl, aralkyl, and alkaryl radicals having 6 to 10 carbon atoms;

$R^9$ is independently selected from the group consisting of H and alkyl radicals having 1 to 6 carbon atoms, provided that adjacent $R^9$ groups are not both alkyl radicals; and n is an integer from 1 to 5, inclusive.

DETAILED DESCRIPTION OF THE INVENTION

This invention provides the following:

1(a). Polymer (1) as defined above.

1(b). Polymer (2) consisting essentially of polymer (1), wherein each polymeric chain is terminated at one end by a —CHO group.

1(c). Polymer (3) consisting essentially of polymer (2), wherein each CHO-terminated polymeric chain is capped by a capping agent which is an aldehyde-reactive compound, said agent optionally containing at least one functional substituent that is unreactive under capping conditions.

1(d). Polymer (4) prepared by hydrogenating polymer 1.

1(e). Polymer (5) prepared by hydrolyzing polymer 1.

2(a). A process for preparing polymer (1) comprising contacting one or more monomers of the formula

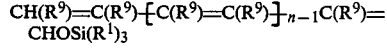

and, optionally, one or more monomers of the formula $$CH_2=CHOSi(R^1)_3$$

under polymerizing conditions with a catalyst which is a Lewis acid, wherein $R^1$, $R^9$ and n are as defined above.

2(b). A process for preparing polymer (2) comprising contacting one or more monomers of the formula

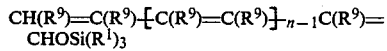

and, optionally, one or more monomers of the formula $$CH_2=CHOSi(R^1)_3$$

under polymerizing conditions with a catalyst which is a Lewis acid and an initiator which is an aldehyde or an aldehyde precursor compound wherein $R^1$, $R^9$ and n are defined as above.

2(c). A process for preparing polymer (3) comprising contacting and reacting polymer (2) with a capping agent which is an aldehyde-reactive compound optionally containing at least one functional substituent that is unreactive under capping conditions.

3(a). A process for polymerizing one or more monomers of the formula

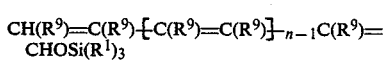

and optionally one or more monomers of the formula $$CH_2=CHOSi(R^1)_3$$

wherein $R^1$, $R^9$, and n are as defined above, said process comprising contacting the monomer or mixture of monomers under polymerizing conditions with a catalyst comprising a Lewis acid, and preferably an initiator comprising an aldehyde or a aldehyde precursor compound.

3(b). Polymer (6) prepared according to the process defined in 3(a).

By "initiator" is meant an aldehyde or aldehyde precursor compound which, in the polymerization processes of the invention, initiates growth of polymer chains and, in conjunction with monomer, essentially controls $\overline{M}_n$ of the polymer product, such that $\overline{M}_n$ is approximately equal to $$\left[\left(\frac{N_m}{N_I} \cdot M_m\right) + M_I\right]$$

wherein $N_m$ and $N_I$, respectively, are the number of moles of monomer and initiator, and $M_m$ and $M_I$, respectively, are the molecular weights of monomer and initiator.

Aldehydes which are useful initiators in the invention for preparing the polymer of formula 2 or the polymer from the process of 3a include, but are not limited to, aliphatic, aromatic and polymeric aldehydes. Preferred aldehyde initiators are those of the formula $R_H(Y^2CHO)_x$;

wherein, in the formula:

$R_H$ is H or a hydrocarbyl radical of valence x which may be an alkyl, cycloalkyl, aryl, alkaryl or aralkyl radical having up to 20 carbon atoms, or a polymeric radical having at least 20 carbon atoms, and which, optionally, may contain ether oxygen and/or one or more functional substituents which are unreactive under polymerizing conditions;

x is an integer and is at least 1, preferably 1 to 10, most preferably 1;

$Y^2$ is $Y^3(C[R^4]_2)_y$;

$Y^3$ is a connecting bond or a divalent radical selected from —C(O)—, —$R^2$—, —N($R^3$)CH$_2$—, —CH($L^1$)—, —CH($L^2$)CH$_2$—, —CH($L^3$)—(CH$_2$)$_a$—C(O)— and

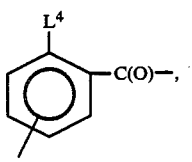

wherein
$R^2$ is an alkylene radical having 1 to 10 carbon atoms or an aralkylene radical having 7 to 20 carbon atoms;
$R^3$ is an alkyl radical having 1 to 4 carbon atoms; each $R^4$ is independently selected from H, $C_{1-10}$ alkyl and $C_{6-10}$ aryl, aralkyl or alkaryl;
$L^1$ is —$OR^5$, —$OR^6OSi(R^1)_3$ or —$OSi(R^1)_3$;
$R^5$ is an alkyl radical having 1 to 4 carbon atoms and $R^6$ is an alkylene radical having 1 to 4 carbon atoms;
$L^2$ is —$OSi(R^1)_3$; $L^3$ is —(CH$_2$)$_b$—C(O)OSi($R^1$)$_3$; $L^4$ is —C(O)OSi($R^1$)$_3$;
each of a and b, independently, is 0, 1 or 2; y is 0 or 1; and
each $R^1$ is independently selected from the group consisting of alkyl radicals having 1 to 10 carbon atoms, alkenyl radicals having 2 or 4–10 carbon atoms, and aryl, aralkyl and alkaryl radicals having 6 to 10 carbon atoms. Most preferred aldehyde initiators are selected from the group consisting of acetaldehyde, isobutyraldehyde, neopentaldehyde, 3-(dimethylamino)propionaldehyde, 3,3',3''-(1,3,5-benzenetriyl)tris(propionaldehyde), benzaldehyde, terephthaldehyde and acrolein homo- and copolymers.

By "aldehyde precursor compound" is meant the compound which, when contacted with a silyl enol ether under polymerizing conditions, forms an aldehyde initiator. The silyl enol ether may be a monomer used in the invention for preparing the polymer of formula 2. Aldehyde precursor compounds include, but are not limited to, those of the formula $R_H(Y^1X^1)_x$ wherein $X^1$ is —OH, —Cl, —Br, —H, —$R^5$, —$OR^5$, Cl$\ominus$, Br$\ominus$, I$\ominus$, $O\ominus R^5$, $O\ominus COR^5$, or $CH_3C_6H_4SO_3\ominus$, wherein $R^5$ is an alkyl radical having 1 to 4 carbon atoms; preferably, $X^1$ is —OH, —Cl, —Br, or —$OR^5$;

$Y^1$ is a connecting bond or a divalent radical selected from —C(O)—, —$R^2$—, —CH[OSi($R^1$)$_3$]—, —CH(OR$^5$)— and —N$\oplus$($R^3$)=CH$_2$, wherein $R^1$, $R^2$, $R^3$ and $R^5$ are as defined above; preferably, $Y^1$ is a connecting bond, —C(O)—, —CH(OR$^5$)— or —$R^2$—; and $Y^1$ and $X^1$ taken together is

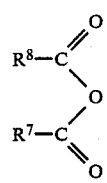

or

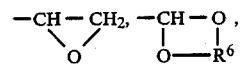

wherein $R^6$ is an alkylene radical having 1 to 4 carbon atoms, $R^8$ is a connecting bond or an alkylene radical having 1 to 10 carbon atoms, and $R^7$ is an alkyl radical having 1 to 10 carbon atoms or an aryl radical having 6 to 10 carbon atoms, or $R^8$ and $R^7$ taken together is

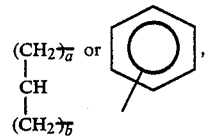

wherein a and b are as defined above; with the provisos that:

(i) when $Y^1$ is a connecting bond, $X^1$ is —OH;
(ii) when $Y^1$ is —C(O)—, $X^1$ is —Cl, —Br, —H, or —$R^5$;
(iii) when $Y^1$ is —$R^2$—, $X^1$ is —Cl or —Br; and
(iv) when $Y^1$ is —N$\oplus$($R^3$)=CH$_2$, $X^1$ is $O\ominus R^5$, $O\ominus COR^5$, Cl$\ominus$, Br$\ominus$, I$\ominus$, or $CH_3C_6H_4SO_3\ominus$. Representative aldehyde precursor compounds are: water; alkanols; aliphatic, aromatic and polymeric primary and secondary bromides and chlorides, for example, n-hexyl bromide and chloride, a,a'-dibromo- and dichloroxylenes, poly(p-chloromethylstyrene); aldehyde acetals, including cyclic acetals; acyl bromides and chlorides; oxiranes; aliphatic and aromatic ketones, for example, diethylketone, cyclohexanone and benzophenone; and aliphatic and aromatic imino esters and their salts. All are known compounds or are readily prepared by known methods.

Haloaromatic compounds, such as bromobenzene, should be avoided unless suitably activated by substituents which are themselves inert under polymerizing conditions.

The in-situ reaction between the aldehyde precursor compound and a silyl enol ether requires at least one mole of silyl enol ether per mole of precursor compound. When the silyl enol ether is not a monomer, the reaction is usually equimolar (1:1).

Preferably, the process of preparing the polymer of formula 2 is carried out in the presence of an aromatic aldehyde. Preferred embodiments of the processes of preparing the polymers of the invention include the additional steps wherein unsaturation is removed by hydrogenation and/or silyl ether groups in the polymers are hydrolyzed to —OH, particularly in the presence of fluoride or bifluoride ions.

Catalysts which are useful in the invention process for preparing polymer (1) are Lewis acids, including but not limited to zinc iodide, zinc bromide, zinc chloride, mercuric iodide, stannic chloride, stannous chloride, ferric iodide, ferric bromide, ferric chloride, zeolites which are at least partially in their hydrogen form, boron trifluoride etherate, zirconium chloride, and dialkyl aluminium halides. Preferably, the catalysts are zinc halides, and most preferably zinc iodide.

The process for preparing polymer (1) is carried out at about −100° C. to about 120° C., preferably at about 0° C. to about 70° C., and most preferably at about 20° C. to about 40° C. When boron trifluoride etherate or a dialkyl aluminum halide is used as the catalyst, the polymerization is carried out above about 0° C. By "polymerizing conditions" is meant an inert medium in the temperature range specified above. A solvent is desirable but not essential.

Suitable solvents are aprotic liquids in which the monomer(s), initiator or initiator precursor, and catalyst are sufficiently dispersible and/or soluble for reaction (polymerization) to occur. A partial list of suitable solvents includes aromatic hydrocarbons, such as toluene or xylene, aliphatic hydrocarbons or chlorinated hydrocarbons. Preferred solvents are toluene, dichloromethane, and 1,2-dichloromethane.

The polyenyloxysilane monomers which are preferred for use in the invention process are those wherein each $R^9$ group is H and each $R^1$ group is alkyl and the total number of carbon atoms in all of the R groups is at least six; more preferably, at least one of these alkyl groups is branched. It has been discovered that use of such monomers can provide polymers of formula (1) having significantly higher molecular weight. While lower molecular weight polymers of formula (1) are useful, especially as intermediates for block copolymers, and in blends with other polymers, the ability to attain higher molecular weight when desired is a preferred feature.

The polyenyloxysilane monomers which are liquids can be polymerized without a solvent, although a solvent is beneficial in controlling exothermic temperature rise during polymerization. When a solvent is used, the monomer can be dispersed in the solvent at concentrations of at least 1 weight percent; preferably, at least 10 weight percent; and most preferably, at about 50 weight percent. The initiator, if used, is employed at a concentration such that the monomer/initiator molar ratio is greater than one and, preferably, greater than 5. The amount of initiator can be varied to control the molecular weight of the polymeric product, in accordance with known polymerization procedures. The catalyst is normally present in such amount that the monomer/catalyst molar ratio is at least 10; preferably, at least 50; and most preferably, at least 100.

In the process for preparing polymer (1), it is preferable to charge the catalyst, initiator, if any, and solvent, if any, to a polymerization vessel before adding the monomer(s), especially if polymeric product of relatively narrow molecular weight distribution, that is, Mw/Mn is between 1 and about 2, are desired. Although it is preferable to charge the catalyst, initiator, and solvent to the polymerization vessel before adding monomer(s), subsequent polymerization rate being controlled by monomer addition, further additions of catalyst can be necessary to sustain polymerization.

The invention polymer (2) is prepared in the presence of an initiator which is an aldehyde or aldehyde precursor compound and contains active terminal —CHO groups until contacted with a reagent which is active towards aldehydes. The —CHO terminated polymer is "living" in the sense that it will polymerize further in the presence of monomer(s) and catalyst, permitting the preparation of "tailored" copolymers, such as block copolymers having highly desirable properties. The non-carbaldehyde portion of the initiating aldehyde is found, by analysis, to be attached to the inactive (non-carbaldehyde) ends of polymeric chains.

The process for preparing the capped polymer (3) is carried out by reacting polymer (2) with an aldehyde-reactive capping agent. Preferred capping agents are silicon compounds, including silyl ketene acetals, silyl enol ethers, silyl ketene imines or the keto forms thereof, having the general formula $(R^1)_3SiQ^1R_p$ wherein $R^1$ is defined as above; $Q^1$ is an enoxy or enimino diradical, or keto form thereof, and $R_p$ is H, an alkyl radical having 1 to 4 carbon atoms, or a methacrylic and/or acrylic polymeric radical. Polymer (2) is reacted with the above-defined silicon compound in the manner described in U.S. Pat. No. 4,544,724. Preferably, the reagent $(R^1)_3SiQ^1R_p$ is the "living"0 polymer disclosed in U.S. Pat. Nos. 4,417,034 and 4,508,880 and EPO Publication No. 0068,887 wherein $R_p$ is a polymeric material. The relevant disclosures of U.S. Pat. Nos. 4,417,034, 4,508,880, and 4,544,724 are incorporated herein by reference. When such "living" polymers are employed, the polymer of formula (2) comprises polyenyloxy-acrylic block polymers which may be linear or branched, the latter having, for example, star or comb configurations.

Other preferred capping agents include those of the formula $R_p^1X^2$ wherein $R_p^1$ is selected from the group consisting of H, alkyl, alkenyl, and alkadienyl radicals having 1 to 20 carbon atoms, cycloalkyl aryl, alkaryl, and aralkyl radicals having 6 to 20 carbon atoms, and polymeric radicals containing at least 20 carbon atoms; any of said radicals optionally containing one or more ether oxygen atoms within aliphatic segments thereof; and any of all the aforesaid radicals, optionally, containing one or more functional substituents that are unreactive under capping conditions; and $X^2$ is a monovalent radical selected from —OH, —CN, —SO$_3$M, —NH$_2$, —ONH$_2$, —NHNH$_2$, —NHC(O)NH$_2$, —NHC(NH)NH$_2$, —NHNHC(O)NH$_2$ and —G where G is the halometal portion of a Grignard reagent and M is H, an alkalimetal or ammonium. Polymer (2) is reacted with the reagent $R_p{}^1$ in the manner described in U.S. Pat. No. 4,544,724, the relevant disclosures of which are incorporated herein by reference.

The invention polymer (1) contains unsaturation and pendant —OSi(R$^1$)$_3$ groups. Unsaturation can be eliminated by reductive hydrogenation employing known methods such as homogeneous hydrogenation in the presence of tris(triphenylphosphine)rhodium chloride. The polymer is dissolved in a suitable aprotic solvent such as toluene, and the reaction is carried out at a temperature of about 10° C. to about 100° C., under positive hydrogen pressures of at least 20 psi (138 kPa). Catalytic hydrogenation with heterogeneous catalysts such as Raney nickel or palladium/carbon has not been successful.

Pendant —OSi(R$^1$)$_3$ groups which can be present in polymers of the invention can be converted to —OH groups by known methods, such as hydrolysis, for example, by treatment with a source of fluoride ion, such as tetraalkylammonium fluoride, dissolved in THF-methanol mixture. The pendant —OH functions are useful reactive sites for cross-linking or other chemical modifications.

It will be understood that invention polymer (1), after reduction and hydrolysis, consists essentially of recurring units of polyalkylene, —[CH(R$^9$)CH(R$^9$)]$_p$—, and hydroxyalkylene, —CH(R$^9$)CH(OH)—, wherein p can vary from a minimum of about 0.02 per unit of hydroxyethelene to a maximum of about 5 per unit of hydroxyalklene. Preferably, R$^9$ is H (i.e. polyalkylene is polyethylene and hydroxyalkylene is hydroxyethylene). These preferred polymers, referred to in the art as vinyl alcohol/ethylene copolymers, are melt-processible into shaped articles having excellent moisture and oxygen barrier properties.

In the following examples of specific embodiments of the invention, all parts and percentages are by weight and degrees are Celsius unless otherwise specified. The polydispersity (D) of the polymer products prepared in the examples is defined by D=Mw/Mn and the molecular weights were determined by gel permeation chromatography (GPC) in which methyl methacrylate standards were used. Unless otherwise specified, molecular weights were measured on the polymer of formula 1 before the polymer was hydrogenated and/or silyl groups were removed.

EXAMPLE 1

A. Preparation of (1,3-Butadienyloxy)phenyldimethylsilane

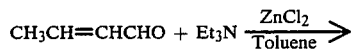

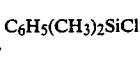

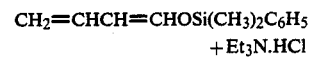

A 250 mL flask, fitted with a magnetic stirrer, a reflux condenser and an addition funnel, was charged with zinc chloride (0.25 g, 1.83 mmol, anhydrous), triethylamine (36.2 mL, 0.260M, distilled from CaH$_2$), crotonaldehyde (21.0 mL, 0.257M, dried over MgSO$_4$ and distilled), and toluene (35 mL, distilled from sodium). 42 mL of phenyldimethyl chlorosilane (0.254M) were added dropwise via the addition funnel over one hour with stirring. The resulting mixture was heated slowly to about 65° and maintained at 65°-75° for a total of 6.5 hours with stirring. The mixture was cooled to ambient temperature and filtered to remove precipitated triethylamine hydrochloride (32 g, 92%) which was rinsed on the filter with 35 mL of dry toluene. The resulting filtrate and rinse were combined and distilled on a water pump at about 110 mm to remove solvent and unreacted starting materials. The resulting residue was distilled on an oil pump to give (1,3-butadienyloxy)phenyldimethylsilane (30.9 g, 59%) as a colorless liquid boiling at 57.8°-59.0°/0.10 mm (13 Pa).

The $^1$H nmr spectrum of the liquid contained resonances at $\delta=7.14$-7.60 ppm (C$_6$H$_5$—), at $\delta=4.57$-6.54 ppm (multi-line pattern corresponding to the CH$_2$=CHCH=CH—group) and at $\delta=0.36$ ppm (CH$_3$—Si) with relative intensities consistent with the (1,3-butadienyloxy)phenyldimethylsilane structure.

B. Polymerization of (1,3-Butadienyloxy)phenyldimethylsilane initiated by benzaldehyde in the presence of zinc iodide A 50 ml flask, fitted with a magnetic stirrer, a dropping funnel, a syringe septum, a thermocouple well and a reflux condenser capped with nitrogen bubbler, was charged with zinc iodide (0.25 g, 0.78 mmol), benzaldehyde (0.22 mL, 2.2 mmol), and methylene chloride (15 mL). The resulting mixture was cooled in a water bath at ambient temperatures. Then, with stirring 12 mL of (1,3-butadienyloxy)phenyldimethylsilane (about 10.0 g, 49 mmol) were added dropwise via the dropping funnel over a period of 30 minutes. A mild exothermic reaction was evident. The reaction mixture was stirred at ambient temperature for about 16 hours. The reaction mixture was filtered to remove suspended undissolved zinc iodide which was washed on the filter with 10 mL of methylene chloride. The resulting filtrate and rinse were combined and distilled on a water pump to remove solvent. The resulting residue was dried under an oil pump vacuum at 50° to give a viscous liquid polymer (10.4 g, 100%) with an inherent viscosity (1.5% in methyl isobutylketone at 25°) of 0.064. Molecular weight (Mn) and polydispersity (D) were determined by gel permeation chromatography (GPC) to be 5290 and 1.93, respectively.

EXAMPLE 2

A. Preparation of (1,3-Butadienyloxy)n-propyldimethylsilane (1,3-Butadienyloxy)n-propyldimethylsilane (b.p. of 61.6°–62.2°/13 mm, 1.7 kPa) was prepared in a 65% yield from n-propyldimethylchlorosilane using a procedure similar to that described in Example 1A. The $^1$H nmr spectrum contained resonances at $\delta=5.71$–6.80 ppm (the $CH_2=CHCH=CH-$ group) at $\delta=0.58$–1.63 ppm (n—$C_3H_7$ group) and at $\delta=0.21$ ppm ($CH_3$—Si) with relative intensities consistent with the title structure.

B. Polymerization of (1,3-Butadienyloxy)n-propyldimethylsilane initiated by benzaldehyde in the presence of zinc iodide An apparatus similar to that described in Example 1B was charged with anhydrous zinc iodide (0.25 g, 0.78 mmol) benzaldehyde (0.22 mL, 2.2 mmol, distilled from calcium hydride), and methylene chloride (15 mL) which had been dried over and distilled from phosporus pentoxide. 10.0 mL of 1,3-butadienyloxy)n-propyldimethylsilane (about 8.0 g, 47 mmol), prepared as described in Part A above, were added dropwise via the dropping funnel over a period of 23 minutes. The ensuing reaction was accompanied by a temperature rise of the reaction mixture of from 17° to 37.2°. The mixture was stirred for about 16 hours at ambient temperature.

The reaction mixture was worked up according to a procedure similar to that disclosed in Example 1B to give a viscous liquid polymer (4.57 g, yield not calculated because of loss on transfer) with the inherent viscosity of 0.060. Molecular weight (Mn) and polydispersity (D) were determined by GPC to be 3550 and 1.8, respectively.

EXAMPLE 3

A. Preparation of (1,3-Butadienyloxy)ethenyldimethylsilane (1,3-butadienyloxy)ethenyldimethylsilane (b.p. 43.0°–46.4°/10.0 mm, 1.3 kPa) was prepared in a 68% yield from ethenyldimethylchlorosilane using a procedure similar to that described in Example 1A. The $^1$H nmr spectrum contained resonances at $\delta=4.69$–6.67 ppm (multiline pattern corresponding to the $CH_2=CHCH-CH-$ and the $CH_2=CH-$ groups) and at $\delta=0.29$ ppm ($CH_3$—Si) with relative intensities consistent with the (1,3-butadienyloxy)ethenyldimethylsilane structure.

B. Polymerization of (1,3-Butadienyloxy)ethenyldimethylsilane initiated by benzaldehyde in the presence of zinc iodide An apparatus similar to that described in Example 1B was charged with anhydrous zinc iodide (0.25 g, 0.78 mmol), benzaldehyde (0.22 mL, 2.2 mmol), and methylene chloride (15 mL). 9.0 mL of (1,3-butadienyloxy)ethenyldimethylsilane (about 7.0 g, 45 mmol), prepared as described in Part A above, were added dropwise via the dropping funnel over a period of 23 minutes. The ensuing reaction was accompanied by a temperature rise of the reaction mixture of from 21.2° to 35.8°. The mixture was stirred for about 16 hours at ambient temperature.

The reaction mixture was worked up according to a procedure similar to that described in Example 1B to give a viscous liquid polymer (6.15 g, about 83%) with an inherent viscosity of 0.050. Molecular weight (Mn) and polydispersity (D) were determined to be 2620 and 2.78, respectively. Proton nmr spectrum indicated that there were about 18 diene units for each phenyl end group and that the vinyl group on the silicon of the diene monomer did not take part in polymerization.

EXAMPLE 4

A. Preparation of (1,3-Butadienyloxy)isopropyldimethylsilane 1,3-Butadienyloxy)isopropyldimethylsilane (b.p. 58.8°–60.2°/11.0 mm, 1.5 kPa) was prepared in a 55% yield from isopropyldimethylchlorosilane using a procedure similar to that described in Example 1A. The $^1$H nmr spectrum contained resonances at $\delta=4.67$–6.81 ppm (the $CH_2=CHCH=CH-$ group) at $\delta=0.67$–1.27 ppm (—CH of isopropyl group), at 0.96 ppm ($CH_3$—C), and at $\delta=0.14$ ppm ($CH_3$—Si) with relative intensities consistent with the (1,3-butadienyloxy)isopropyldimethylsilane structure.

B. Polymerization of (1,3-Butadienyloxy)isopropyldimethylsilane initiated by benzaldehyde in the presence of zinc iodide An apparatus similar to that described in Example 1B was charged with anhydrous zinc iodide (0.25 g, 0.78 mmol), benzaldehyde (0.22 mL, 2.2 mmol), and methylene chloride (15 mL). 10.0 mL (about 47 mmol) of (1,3-butadienyloxy)isopropyldimethylsilane, prepared as described in Part A above, were added dropwise via the dropping funnel over a period of 17 minutes. The ensuing exothermic reaction was accompanied by a temperature rise of the reaction mixture of from 21° to 29°. The mixture was stirred for about 19 hours at ambient temperature.

The reaction mixture was worked up according to a procedure similar to that described in Example 1B to give a viscous liquid polymer (7.67 g, 96%) with an inherent viscosity of 0.064. Molecular weight (Mn) and polydispersity were determined to be 3680 and 1.64, respectively. Proton nmr spectrum indicated that there were about 16 diene units for each phenyl end group.

EXAMPLE 5

A. Preparation of (1,3-Butadienyloxy)t-butyldimethylsilane

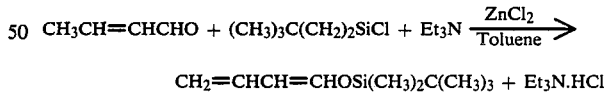

$$CH_3CH=CHCHO + (CH_3)_3C(CH_2)_2SiCl + Et_3N \xrightarrow[\text{Toluene}]{ZnCl_2}$$

$$CH_2=CHCH=CHOSi(CH_3)_2C(CH_3)_3 + Et_3N\cdot HCl$$

A 1 L flask equipped with a magnetic stirrer, a reflux condenser, a syringe adapter and a thermocouple was charged with anhydrous zinc chloride (10.87 g, 79.8 mmol) t-butyldimethylchlorosilane (195.49 g, 1.297 mol), crotonaldehyde (108 mL, 1.32 mole, dried and distilled), triethylamine (190 mL, 1.36 mole, distilled from CaH$_2$) and toluene (180 mL, distilled from Na). The resulting mixture was refluxed for about 18 hours. The ensuing reaction was accompanied by a temperature rise of the mixture of from 101° to 107°. The mixture was cooled to ambient temperature and filtered. The resulting solid was rinsed on the filter with toluene. The resulting filtrate and rinse were combined and distilled on a water pump at about 50 mm (6.7 kPa) to remove solvent and unreacted starting materials. The resulting residue was filtered to remove additional precipitate and distilled on an oil pump at about 2 mm (0.27 kPa) to give (1,3-butadienyloxy)t-butyldimethylsilane (50.27 g, 21%, distilling at 26.2°/2.6 mm (0.35 kPa)–48.2°/3.0 mm (0.40 kPa)). Redistillation of this material through an 18″ spinning band still gave the title compound as a colorless liquid boiling at 42.2°/4.0 mm (0.53 kPa)–54.6°/5.2 mm (0.69 kPa). The $^1$H nmr spectrum contained resonances at δ=4.62–6.67 ppm ($CH_2$=CHCH=CH— group), at δ=0.87 ppm (C—$CH_3$), at δ=0.11 ppm (Si—$CH_3$) with relative intensities consistent with the (1,3-butadienyloxy)t-butyldimethylsilane structure.

B. Polymerization of (1,3-Butadienyloxy)t-butyldimethylsilane initiated by benzaldehyde in the presence of zinc iodide An apparatus similar to that described in Example 1B was charged with anhydrous zinc iodide (0.055 g, 1.7 mmol), benzaldehyde (0.060 mL, 0.59 mmol), and methylene chloride (15 mL). 12.0 mL of (1,3-butadienyloxy)t-butyldimethylsilane (about 9.6 g, 52 mmol), prepared as described in Part A above, were added dropwise via the dropping funnel over a period of 33 minutes. The ensuing reaction was accompanied by a temperature rise of from 20.2° to 27.0°. The mixture was stirred for about 20 hours at ambient temperature.

The reaction mixture was filtered and the resulting filtrate was distilled on a water pump to remove solvent. The resulting residue was dried under an oil pump vacuum to give a tough semi-solid colorless polymer (10.01 g, 100%) having an inherent viscosity of 0.106. Proton nmr spectrum indicated that there were about 99 diene units for each phenyl end group. Molecular weight and polydispersity (D) were determined by GPC to be 11,600 and 2.30, respectively.

EXAMPLE 6

A. Preparation of (1,3-Butadienyloxy)(2-phenylethyl)dimethylsilane (1,3-Butadienyloxy)(2-phenylethyl)dimethylsilane (b.p. of 76.6°–81.8°/0.05 mm, 6.7 Pa) was prepared in a 62% yield from (2-phenylethyl)dimethylchlorosilane using a procedure similar to that described in Example 1A. The $^1$H nmr spectrum contained resonances at δ=4.63–6.57 ppm ($CH_2$=CHCH=CH— group, at δ=7.08 ppm ($C_6H_5$), and at δ=0.09 ppm (Si—$CH_3$), with relative intensities consistent with the (1,3-butadienyloxy)(2-phenylethyl)dimethylsilane structure.

B. Polymerization of (1,3-Butadienyloxy)(2-Phenylethyl)dimethylsilane initiated by benzaldehyde in the presence of zinc iodide An apparatus similar to that described in Example 1B was charged with anhydrous zinc iodide (0.25 g, 0.78 mmol), benzaldehyde (0.22 mL, 2.2 mmol) and methylene chloride (15 mL). 14.0 mL of (1,3-butadienyloxy)(2-phenylethyl)dimethylsilane (about 12.6 g, 54 mmol) prepared as described in Part A above, were added dropwise via the dropping funnel over a period of 35 minutes. The ensuing reaction was accompanied by a temperature rise of the reaction mixture of from 20.2° to 32.6°. The mixture was stirred at ambient temperatures for about 19 hours.

The reaction mixture was worked up according to a procedure similar to that described in Example 1B to give a viscous liquid polymer (12.18 g, about 95%) with an inherent viscosity of 0.063. Molecular weight (Mn) and polydispersity (D) of the major component of the product were determined by GPC to be 5180 and 2.13 respectively. A small amount of a relatively low molecular weight fraction was also present in the product.

EXAMPLE 7

Polymerization of (1,3-Butadienyloxy)trimethylsilane initiated by benzaldehyde in the presence of zinc iodide An apparatus similar to that described in Example 1B was charged with 0.69 g (2.2 mmol) of reagent grade zinc iodide. The flask was evacuated to a pressure of less then 1 mm (0.13 kPa) and heated with a heat gun for a period of 10 minutes to completely dry the zinc iodide. The flask was brought back to atmospheric pressure with dry nitrogen and charged with benzaldehyde (0.22 mL, 2.2 mmol) and methylene chloride (15 mL). 16.5 mL (136.5 mmol) of (1,3-butadienyloxy)trimethylsilane were added via the dropping funnel over a period of 42 minutes. The reaction mixture was stirred for about 20 hours at ambient temperature.

The reaction mixture was worked up according to a procedure similar to that described in Example 1B to give a viscous liquid polymer (11.85 g, 87%) with an inherent viscosity of 0.067. Molecular weight (Mn) and polydispersity were determined to be 4020 and 6.30, respectively. Proton nmr spectrum indicated that there were about 23 diene units for each phenyl end group. The infrared spectrum contained bands at 2950, 2900 and 2860 cm$^{-1}$ (sat CH), 3030 cm$^{-1}$ (=CH), 1660 cm$^{-1}$ (conj. aldehyde C=O), 1250, 840 and 750 cm$^{-1}$ (Si—$CH_3$) and at 970 cm$^{-1}$ which is the C—H out of plane deformation frequency diagnostic of an internal trans—CH=CH.

EXAMPLE 8

Polymerization of (1,3-Butadienyloxy)trimethylsilane initiated by benzaldehyde in the presence of zinc iodide An apparatus similar to that described in Example 1B was charged with 1.37 g (4.3 mmol) of reagent grade zinc iodide. The flask was evacuated, heated, and brought back to atmospheric pressure according to a method similar to that described in Example 7. The flask was charged with benzaldehyde (0.44 mL, 4.4 mmol) and methylene chloride (15 mL). 16.5 mL of (1,3-butadienyloxy)trimethylsilane (13.4 g, 136.5 mmol) were added dropwise via the dropping funnel over a period of 27 minutes. The ensuing exothermic reaction was accompanied by a temperature rise of the reaction mixture of from 22.6° to 36.8°. The mixture was stirred for about 20 hours at ambient temperature.

The reaction mixture was worked up according to a procedure similar to that described in Example 1B to give a viscous liquid polymer (11.39 g, 82%) with an inherent viscosity of 0.051. Molecular weight (Mn) and polydispersity were determined to be 4290 and 7.52, respectively. The $^1$H nmr spectrum of the isolated polymer contained major resonances at δ=0.10 ppm (Si—$CH_3$), 2.16 ppm (—$CH_2$—), 4.02 ppm (—CH—OSi) and at 5.48 ppm (=CH). A comparison of the relative intensities of these resonances indicated that there are two =CH protons which is consistent with a linear arrangement in the polymer backbone of the 4 carbon atoms of the butadiene units. There are also other nmr resonances which could arise from the pressure of small amounts of isomeric structures.

EXAMPLE 9

Polymerization of (1,3-Butadienyloxy)trimethylsilane initiated by benzaldehyde in the presence of zinc bromide A 250 mL flask, fitted with a magnetic stirrer, a dropping funnel, a syringe septum, a thermocouple well and a reflux condenser capped with a nitrogen bubbler was charged with anhydrous zinc bromide (0.71 g, 5.2 mmol), benzaldehyde (0.44 mL, 4.4 mmol), and methylene chloride (50 mL). 58.5 mL of (1,3-butadienyloxy)-trimethylsilane (47.4 g, 333.5 mmol) were added dropwise via the dropping funnel over a period of 54 minutes. The mixture was stirred for about 16 hours at ambient temperature.

The reaction mixture was worked up according to a procedure similar to that described in Example 1B to give a viscous liquid polymer (38.35 g, 80%) with an inherent viscosity of 0.072. Molecular weight (Mn) and polydispersity were determined to be 5060 and 2.30, respectively. Proton nmr spectrum indicated that there were about 47 diene units for each phenyl end group.

EXAMPLE 10

Copolymerization of (1,3-Butadienyloxy)trimethylsilane and (Ethenyloxy)t-butyldimethylsilane An apparatus similar to that described in Example 1B was charged with 0.15 g of reagent grade zinc iodide. The flask was evacuated, heated, and brought back to atmospheric pressure according to a procedure similar to that described in Example 7. The flask was charged with benzaldehyde (0.22 mL, 2.2 mmol) and methylene chloride (15 mL). A well mixed mixture of 11.3 mL of (ethenyloxy)t-butyldimethylsilane (8.98 g, 56.8 mmol) and 5.1 mL (4.14 g, 42.2 mmol) of (1,3-butadienyloxy)-trimethylsilane was added dropwise via the dropping funnel over a period of 39 minutes. The ensuing exothermic reation was accompanied by a temperature rise of the reaction mixture of from 24.6° to 33.2°. The mixture was stirred for about 20 hours at ambient temperature.

The reaction mixture was worked up according to a procedure similar to that described in Example 1B to give a viscous liquid polymer (10.73 g, 79%) with an inherent viscosity of 0.037. Molecular weight (Mn) and polydispersity were determined to be 1970 and 1.80, respectively. Proton nmr spectrum indicated that there were about 16 diene units for each phenyl end group. The $^1$H nmr spectrum indicated that the ratio of monomers in the copolymer was close to 2 vinyl ether units for each diene unit.

The monomodal molecular weight distribution curve indicated that the product was a true copolymer.

EXAMPLE 11

Reduction of a Copolymer of (1,3-Butadienyloxy)trimethylsilane and (Ethenyloxy)t-butyldimethylsilane A stainless steel pressure vessel which had been flushed with dry nitrogen was charged with 1.00 g of tris(triphenylphosphine)rhodium chloride and a solution of 5.53 g of the copolymer prepared in Example 10 dissolved in 100 mL of anhydrous toluene. The vessel was cooled in dry ice, evacuated, pressured with hydrogen and heated at 60° for 24 hours while the hydrogen pressure was maintained at 200 psi (1.38 MPa).

An $^1$H nmr spectrum on a sample of the product obtained by evaporating the solvent showed that the polymer contained little if any carbon-carbon unsaturation.

EXAMPLE 12

Reduction of a Polymer of (1,3-Butadienyloxy)trimethylsilane

A mixture of 1.00 g of tris(triphenylphosphine)rhodium chloride and a solution of 6.71 g of a (1,3-butadienyloxy)trimethylsilane polymer, prepared according to a procedure similar to that described in Examples 7-9, in 100 ml of anhydrous toluene was reduced at 60° and 200 psi (1.38 MPa) hydrogen pressure for a period of 24 hours according to a procedure similar to that described in Example 12.

An $^1$H nmr spectrum of a sample of the product obtained by evaporating the solvent showed that it contained just a little unsaturated CH. The reduction was estimated to be 90-95% complete.

EXAMPLE 13

Copolymerization of (1,3-Butadienyloxy)t-butyldimethylsilane and (Ethenyloxy)t-butyldimethylsilane initiated by benzaldehyde in the presence of zinc iodide An apparatus similar to that described in Example 1B was charged with anhydrous zinc iodide (0.25 g, 0.78 mmol), benzaldehyde (0.22 mL, 2.2 mmol), and methylene chloride (15 mL). A well mixed mixture of (1,3-butadienyloxy)t-butyldimethylsilane (7.0 mL, about 5.6 g, 30.4 mmol) and (ethenyloxy)t-butyldimethylsilane (6.0 mL, 4.8 g, 30.4 mmol) was added dropwise via the dropping funnel over a period of 35 minutes. The ensuing exothermic reaction was accompanied by a temperature rise of the reaction mixture of from 19.6° to 25.2°. The mixture was stirred for about 18 hours at ambient temperature.

The reaction mixture was worked up according to a procedure similar to that described in Example 1B to give a viscous liquid polymer (9.78 g, 95%) with an inherent viscosity of 0.052. Molecular weight (Mn) and polydispersity were determined to be 4660 and 1.68, respectively. Proton nmr spectrum indicated that there were about 16 diene units for each phenyl end group. The relative intensities of appropriate resonances in the $^1$H nmr spectrum indicated that the polymeric product contained approximately equimolar quantities of the two monomers. The monomodal molecular weight distribution curve indicates that the product was a true copolymer.

EXAMPLE 14

Preparation of a Block Copolymer of (1,3-Butadienyloxy)trimethylsilane and (Ethenyloxy)t-butyldimethylsilane initiated by benzaldehyde in the presence of zinc iodide An apparatus similar to that described in Example 1B was charged with 0.69 g (2.2 mmol) of reagent grade zinc iodide. The flask was evacuated, heated, and brought back to atmospheric pressure according to a procedure similar to that described in Example 7. The flask was charged with benzaldehyde (0.22 mL, 2.2 mmol) and methylene chloride (15 mL). 8.3 mL of (1,3- butadienyloxy)trimethylsilane (6.7 g, 47.1 mmol) were added dropwise via the dropping funnel over a period of 29 minutes. The ensuing exothermic reaction was accompanied by a temperature rise of the reaction mixture from 21.6° to 29.2°. After the exothermic reaction appeared to be over, 6.2 mL of (ethenyloxy)t-butyldimethylsilane (4.9 g) were added dropwise via the dropping funnel over a period of 37 minutes. The mixture was stirred for a period of about 16 hours at ambient temperature. The reaction mixture was worked up according to a procedure similar to that described in Example 1B to give a viscous liquid polymer (11.01 g, 95%) with an inherent viscosity of 0.049. Molecular weight (Mn) and polydispersity were determined to be 2400 and 1.94, respectively.

A comparison of the intensities of appropriate resonances in the $^1$H nmr spectrum indicated that the ratio of monomers in the copolymer was 1.29 diene units for each ethenyloxy unit. The monomodal molecular weight distribution curve indicates that the product was a true copolymer.

EXAMPLE 15

Preparation of a Block Copolymer of (1,3-Butadienyloxy)trimethylsilane and (Ethenyloxy)t-butyldimethylsilane initiated by benzylaldehyde in the presence of zinc iodide An apparatus similar to that described in Example 1B was charged with 0.69 g of reagent grade zinc iodide. The flask was evacuated, heated, and brought back to atmospheric pressure according to a procedure similar to that described in Example 7. The flask was charged with benzaldehyde (0.22 mL, 2.2 mmol) and methylene chloride (15 mL). 9.2 mL of (ethenyloxy)t-butyldimethylsilane (7.3 g, 46.2 mmol) were added dropwise via the dropping funnel over a period of 34 minutes. The ensuing exothermic reaction was accompanied by a temperature rise of the reaction mixture of from 21.6° to 36.8°. After the exothermic reaction appeared to be over, 8.3 mL (1.30 mmol) of (1,3-butadienyloxy)t-butyldimethylsilane were added dropwise via the dropping funnel over a period of 23 minutes. The resulting mixture was stirred for a period of about 15 hours at ambient temperature.

The reaction mixture was worked up according to a procedure similar to that described in Example 1B to give a viscous liquid polymer (12.13 g, 84%) with an inherent viscosity of 0.048. Molecular weight (Mn) and polydispersity were determined to be 3010 and 1.86, respectively. A comparison of the intensities of appropriate resonances in the $^1$H nmr spectrum indicated that the ratio of monomers in the copolymer was 1.26 vinyl ether units for each diene unit. The monomodal molecular weight distribution curve indicates that the product was a true copolymer.

EXAMPLE 16

Polymerization of (1,3-Butadienyloxy)trimethylsilane initiated by benzaldehyde in the presence of zinc iodide A 250 mL flask, fitted with a magnetic stirrer, a dropping funnel, a syringe septum, a thermocouple well and a reflux condenser capped with a nitrogen bubbler, was charged with anhydrous zinc iodide (0.50 g, 1.57 mmol), benzaldehdye (0.44 mL, 4.4 mmol) and methylene chloride (60 mL). 59 mL of (1,3-butadienyloxy)-trimethylsilane (47.8 g, 336 mmol) were added dropwise via the dropping funnel over a period of 40 minutes. The resulting mixture was stirred at ambient temperature for about 16 hours.

The reaction mixture was worked up according to a procedure similar to that described in Example 1B to give a viscous liquid polymer (38.29 g, 79%) with an inherent viscosity of 0.080. Molecular weight (Mn) and polydispersity (D) were determined by GPC to be 6220 and 2.45, respectively. Proton nmr spectrum indicated that there were about 60 diene units for each phenyl end group.

EXAMPLES 17 AND 18

Polymerization of (1,3-Butadienyloxy)t-butyldimethylsilane in the presence of zinc iodide An apparatus similar to that described in Example 1B was charged with zinc iodide (0.50 g, 1.57 mmol) and methylene chloride (15 mL). 11.0 mL of (1,3-butadienyloxy)-t-butyldimethylsilane (about 8.8 g, 10.2 mmol) were added dropwise via the dropping funnel over a period of 15 minutes. The ensuing mild exothermic reaction began about 30 minutes after the addition was completed. The reaction mixture was stirred at ambient temperature for about 16 hours.

The reaction mixture was worked up according to a procedure similar to that described in Example 1B to give a viscous liquid polymer (8.22 g, 93%) with an inherent viscosity of 0.073. Molecular weight (Mn) and polydispersity (D) were determined by GPC to be 8530 and 1.97, respectively.

Another run was carried out according to a procedure similar to that described above except that benzaldehyde (0.050 mL, 0.50 mmol) was added to the apparatus as described in Example 1B. The reaction mixture was worked up as described above to give a viscous liquid polymer (8.21 g, 93%) with an inherent viscosity of 0.063. Molecular weight (Mn) and polydispersity were determined by GPC to be 5970 and 1.68, respectively.

The polymers prepared above were compared by infrared spectroscopy. The polymers generated spectra which were essentially identical except that the polymer prepared with benzaldehyde initiator contained a weak band at 1700 cm$^{-1}$, whereas the spectrum of the polymer prepared without benzaldehyde had no such band. The band is believed to represent the C=O frequency for an aldehyde end group.

EXAMPLE 19

Removal of Silyl Groups from a Polymer of (1,3-Butadienyloxy)t-butyldimethylsilane A mixture of 4.84 g of a polymer of (1,3-butadienyloxy)t-butyldimethylsilane prepared according to a method similar to that described in Example 17 with an inherent viscosity of 0.070, 20 mL of anhydrous tetrahydrofuran, 4 mL of reagent grade methanol, and 53 mL of 1M tetrabutylammonium fluoride in tetrahyrofuran was refluxed for about 4 hours.

A sample of the resulting mixture was withdrawn and added to a large excess of water. The resulting solid, tan, powdery precipitate was filtered and dried on the filter. An infrared spectrum of the precipitate showed that it was primarily a polymeric unsaturated alcohol: 3390 cm$^{-1}$ (—OH), 2920+2850 cm$^{-1}$ (sat CH), 1050 cm$^{-1}$ (C—O), and 970 cm$^{-1}$ (trans internal (C=C)). Thus the spectrum is consistent with

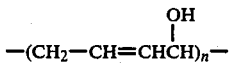

Weak absorbtion at 1255 cm and 835 cm$^{-1}$ indicates a small amount of residual Si—CH$_3$ groups. The polymer was pressed at 150° to a translucent self-supporting film.

EXAMPLE 20

Polymerization of (1,3-Butadienyloxy)trimethylsilane in the Presence of Stannic Chloride An apparatus similar to that described in Example 1B was charged with 15 mL of methylene chloride and 15 mL (85.4 mmol) of (1,3-butadienyloxy)trimethylsilane. A solution of 0.25 g (0.96 mmol) of anhydrous stannic chloride in 5 mL of methylene chloride was added dropwise via the dropping funnel over a period of 21 minutes. The resulting mixture was stirred for a period of about 16 hours at ambient temperature.

The solid reaction mixture was broken up under methanol and the resulting polymer was isolated, further washed with methanol, and dried in a vacuum oven. The resulting product weighed 6.05 g (100%) and was shown by infrared spectroscopy to be essentially the same as the polymeric unsaturated alcohol obtained in Example 19.

EXAMPLE 21

Copolymerization of (1,3-Butadienyloxy)isopropyldimethylsilane and (Ethenyloxy)-t-butyldimethylsilane in the Presence of Zinc Iodide An apparatus similar to that described in Example 1B was charged with 0.058 g (0.18 mmol) of anhydrous zinc iodide and 15 mL of methylene chloride. A well mixed mixture of 10.0 mL of (1,3-butadienyloxy)isopropyldimethylsilane (about 8.09 g, 47.6 mmol) and 9.3 mL (46.7 mmol) of (ethenyloxy)-t-butyldimethylsilane was added dropwise via the dropping funnel over a period of 30 minutes. The ensuing exothermic reaction was accompanied by a temperature rise of the reaction mixture of from 21.0° to 39.8°. The mixture was stirred at ambient temperature for about 15 hours.

The reaction mixture was worked up according to a procedure similar to that described in Example 1B to give a colorless viscous semi-solid polymer (14.03 g, 91%) with an inherent viscosity of 0.090. Molecular weight (Mn) and polydispersity (D) were determined by GPC to be 7.670 and 3.06, respectively.

EXAMPLE 22

A. Preparation of (1,3,5-Hexatrienyloxy)trimethylsilane

A 500 mL flask, fitted with a magnetic stirrer, an addition funnel, a thermocouple, and a reflux condenser connected to a nitrogen bubbler was charged with zinc chloride (0.50 g, 3.67 mmol), 72.4 mL of triethylamine (52.6 g, 0.519M, distilled from CaH$_2$), 56.8 mL of freshly distilled 2,4-hexadienal (49.5 g, 0.515M, b.p.=53.2°–53.6°/10 mm, 1.3 kPa), and 70 mL of toluene (distilled from Na). 64.4 mL of trimethylchlorosilane (55.1 g, 0.507M) were added dropwise via the addition funnel over a period of 68 minutes with stirring. The resulting mixture was heated to 63° and maintained at about this temperature for 6 hour and 50 minutes. The mixture was cooled to ambient temperature and filtered to remove precipitated triethylamine hydrochloride. The resulting solid was rinsed on the filter with 70 mL of dry toluene. The resulting filtrate and rinse were combined and distilled on a water pump, first at about 100 mm (13.3 kPa) to remove solvent and unreacted starting materials and then at about 13 mm (1.7 kPa). Examination of the forerun indicated that it contained additional product. The total yield was estimated to be about 55%. For polymerization, the material was redistilled through an 18-inch spinning band still: b.p.=56.4°/3.0 mm (0.40 kPa); 62.2°/5.0 mm (0.67 kPa).

The $^1$H NMR spectrum (90 mHz) of the material contained a multi-line pattern for the hexatriene portion of the molecule at ä=4.8-6.7 ppm. The high field portion of this pattern consists of a pair of overlapping doublets at ä=4.99 ppm (J=9 Hz) and at ä=5.12 ppm (J=15 Hz) which corresponds to the terminal CH$_2$ of the hexatriene moiety. The rest of the hexatriene protons are represented by a very complicated series of lines at ä=5.58-6.70 ppm. The methyl-on-silicon resonance is a singlet at ä=0.23 ppm. The relative intensities of these three groups of resonances are consistent with the (1,3,5-hexatrienyloxy)trimethylsilane structure.

B. Polymerization of (1,3,5-Hexatrienyloxy)trimethylsilane initiated by benzaldehyde in the presence of zinc iodide A 50 mL flask, fitted with a magnetic stirrer, a dropping funnel, a syringe septum, a thermocouple well and a reflux condenser capped with a nitrogen bubbler, was charged with anhydrous zinc iodide (0.084 g, 0.26 mmol), 15 mL of methylene chloride, and benzaldehyde (0.080 mL, 0.80 mmol.). The reaction flask was cooled in a water bath at ambient temperature while 10 mL of 1,3,5-hexatrienyloxy)trimethylsilane (8.0 g, 47.6 mmol) were added dropwise via the dropping funnel over a period of 25 minutes. The resulting mixture was stirred at ambient temperature for about 16 hours and then filtered to remove some suspended solid. The resulting filtrate was distilled on a water pump to remove solvent, and the resulting residue was dried under an oil pump vacuum at 50° C. to give a viscous liquid polymer (5.81 g, 73%). The liquid polymer became a tough, hard solid under nitrogen.

The infrared spectrum (KBr) of the solid polymer contained bands at 3020 cm$^{-1}$ (=CH), 2960 and 2900 cm$^{-1}$ (sat. CH), 1695 cm$^{-1}$ (conj. aldehyde C=O), 1660 and 1620 cm$^{-1}$ (conj. C=C), and at 1255 and 840 cm$^{-1}$ (Si—CH$_3$). This spectrum is consistent with a linear polymer structure. A self-supporting film was pressed at 150°.

EXAMPLE 23

Polymerization of (1,3,5-Hexatrienyloxy)trimethylsilane in the presence of zinc iodide (1,3,5-hexatrienyloxy)trimethylsilane was polymerized according to a procedure similar to that described in Example 22 except that no benzaldehyde was used. The time period for adding the monomer was 27 minutes and the reaction mixture was stirred at ambient temperature for about 16 hours after the monomer was added. After standing for three days under nitrogen, the reaction mixture was filtered and rinsed on the filter with fresh methylene chloride. The resulting residue was dried in a vacuum at 50° to give 7.36 g of poly-(1,3,5-hexatrienyoxy)trimethylsilane (92%) as an amber-colored, hard solid. The polymer was insoluble in tetrahydrofuran, methylene chloride, and dimethyl-formamide, but could be pressed to an opaque, self-supporting film at 150°.

EXAMPLE 24

Copolymerization of
(1,3,5-Hexatrienyloxy)trimethylsilane and
(Ethenyloxy)t-butyldimethylsilane (1:1) initiated by
benzaldehyde in the presence of zinc iodide An apparatus similar to that described in Example 22B was charged with anhydrous zinc iodide (0.10 g, 0.31 mmol), methylene chloride (15 mL), and benzaldehyde (0.10 mL, 1.0 mmol). A well-mixed solution of (1,3,5-hexatrienyloxy)trimethylsilane (12.0 mL, 9.6 g, 57.1 mmol) and (ethenyloxy)t-butyldimethylsilane (11.4 mL, 9.1 g, 57.6 mmol) was added dropwise via the dropping funnel over a period of 34 minutes. The resulting mixture was stirred at ambient temperature for about 16 hours.

The reaction mixture was worked up according to a procedure similar to that described in Example 22B to give a hard, yellow product (14.78 g, 79%). The product was somewhat soluble in tetrahydrofuran and could be cast to a clear film from the solvent.

EXAMPLE 25

Copolymerization of
(1,3,5-Hexatrienyloxy)trimethylsilane and
(Ethenyloxy)t-butyldimethylsilane (1:3) initiated by
benzaldehyde in the presence of zinc iodide An apparatus similar to that described in Example 22B was charged with anhydrous zinc iodide (0.050 g, 0.16 mmol), methylene chloride (25 mL), and benzaldehyde (0.050 mL, 0.50 mmol). A well-mixed solution of (1,3,5-hexatrienyloxy)trimethylsilane (8.8 mL, 7.0 g, 41.6 mmol) and (ethenyloxy)t-butyldimethylsilane (25.0 mL, 19.9 g, 126 mmol) was added dropwise via the dropping funnel over a period of 35 minutes. The resulting mixture was stirred at ambient temperature for about 16 hours.

The resulting viscous reaction mixture was dripped slowly into 500 mL of methanol with rapid stirring. The resulting polymer was isolated, rinsed with fresh methanol and dried in a vacuum oven at 55°-60° to give a hard pale yellow product (22.5 g, 83%). The product was somewhat soluble in tetrahydrofuran and toluene. The polymer was plasticized with acetone to give a sticky, gelatinous material. A translucent, self-supporting film was pressed at 100°. The product had an inherent viscosity of 0.151 (0.10% in toluene at 25°).

EXAMPLE 26

Copolymerization of
(1,3,5-Hexatrienyloxy)trimethylsilane and
(ethenyloxy)t-butyldimethylsilane (1:5) initiated by
benzaldehyde in the presence of zinc iodide An apparatus similar to that described in Example 22B was charged with anhydrous zinc iodide (0.050 g, 0.16 mmol), methylene chloride (25 mL), and benzaldehyde (0.050 mL, 0.50 mmol). A well-mixed solution of (1,3,5-hexatrienyloxy)trimethylsilane (5.3 mL, 4.2 g, 25.0 mmol) and (ethenyloxy)t-butyldimethylsilane (25.0 mL, 19.9 g, 126 mmol) was added dropwise via the dropping funnel over a period of 31 minutes. The resulting mixture was stirred at ambient temperature for about 16 hours.

The resulting viscous reaction mixture was worked up according to a procedure similar to that described in Example 25 to give a hard, colorless product (20.90 g, 86%) with an inherent viscosity of 0.076. A comparison of the intensities of appropriate resonances in the $^1$H NMR spectrum indicated that the ratio of monomers in the product was about 5 ethenyloxy units for each triene unit. Molecular weight (Mn) and polydispersity (P) were determined by GPC to be 6,810 and 3.77, respectively.

EXAMPLE 27

Copolymerization of
(1,3,5-Hexatrienyloxy)trimethylsilane and
(1,3-Butadienyloxy)trimethylsilane (1:2) initiated by
benzaldehyde in the presence of zinc iodide An apparatus similar to that described in Example 22B was charged with anhydrous zinc iodide (0.25 g, 0.78 mmol), methylene chloride (15 mL), and benzaldehyde (0.22 mL, 2.2 mmol). A well-mixed solution of (1,3,5-hexatrienyloxy)trimethylsilane (5.0 mL, 4.0 g, 23.8 mmol) and (1,3-butadienyloxy)trimethylsilane (8.5 mL, 6.9 g, 48.6 mmol) was added dropwise via the dropping funnel over a period of 30 minutes. The resulting mixture was stirred at ambient temperature for about 16 hours.

The reaction mixture was worked up according to a procedure similar to that described in Example 22B to give a very viscous liquid polymer (9.78 g, 88%) with an inherent viscosity of 0.140. Molecular weight (Mn) and polydispersity (D) were determined by GPC to be 7,800 and 6.12, respectively.

EXAMPLE 28

Copolymerization of
(1,3,5-Hexatrienyloxy)trimethylsilane and
(1,3-Butadienyloxy)t-butyldimethylsilane (1:2) initiated
by benzaldehyde in the presence of zinc iodide An apparatus similar to that described in Example 22B was charged with anhydrous zinc iodide (0.50 g, 1.57 mmol), methylene chloride (25 mL), and benzaldehyde (0.050 mL, 0.50 mmol). A well-mixed solution of (1,3,5-hexatrienyloxy)trimethylsilane (11.4 mL, 9.1 g, 54.1 mmol) and (1,3-butadienyloxy)t-butyldimethylsilane (25 mL, 20 g, 108.6 mmol) was added dropwise via the dropping funnel over a period of 29 minutes. The resulting mixture was stirred at ambient temperature for about 16 hours.

The resulting viscous reaction mixture was worked up according to a procedure similar to that described in Example 27 to give a colorless, tough semi-solid product (20.76 g, 76%). A comparison of intensities of appropriate resonances in the $^1$H NMR spectrum indicated that the ratio of monomers in the product was about 2.3 diene units for each triene unit. Molecular weight (Mn) and polydispersity (D) were determined by GPC to be 9,930 and 4.39, respectively. A film was pressed at 100°.

EXAMPLE 29

Removal of Silyl Groups from a Copolymer of
(1,3,5-Hexatrienyloxy)trimethylsilane and
(Ethenyloxy)t-butyldimethylsilane A mixture of 5.06 g of copolymer of (1,3,5-hexatrienyloxy)trimethylsilane and (ethenyloxy)t-butyldimethylsilane with an inherent viscosity of 0.090, prepared according to a method similar to that described in Example 26 above, 20 mL of anhydrous tetrahydrofuran, 4 mL of reagent grade methanol, and 50 mL of 1M tetrabutylammonium fluoride in tetrahydrofuran was refluxed for 4 hours. The mixture was cooled to ambient temperature, filtered, and dripped slowly into 500 mL of distilled water with stirring. The resulting tan precipitate was filtered, rinsed on the filter with distilled water, and dried in a vacuum oven at 50°-60° to give a hard, tan product (1.69 g, 100%). The infrared spectrum indicated that the product was an unsaturated alcohol: 3400 cm$^{-1}$ (—OH), 3020 cm$^{-1}$ (unsat. CH), 2960, 2930 and 2860 cm$^{-1}$ (sat. CH), and 1075 cm$^{-1}$ (C—O). Weak absorption at 1255, 840 and 780 cm$^{-1}$ indicated that the product had a small amount of residual Si—CH$_3$ groups. An opaque, self-supporting film was pressed at 150°.

EXAMPLE 30

Reduction of a Copolymer of (1,3,5-Hexatrienyloxy)trimethylsilane and (Ethenyloxy)t-butyldimethylsilane A mixture of 1.00 g of tris(triphenylphosphine)rhodium chloride and a solution of 7.00 g of a copolymer of (1,3,5-hexatrienyloxy)trimethylsilane and (ethenyloxy)t-butyldimethylsilane, prepared according to a method similar to that described in Example 26 above, in 100 mL of anhydrous toluene was reduced at 100° and 300 psi (2.1 MPa) for a period of 10 hours in a stainless steel pressure vessel.

A $^1$H NMR spectrum of a sample of the resulting product obtained by evaporating the solvent indicated that most of the unsaturated CH had been converted to saturated CH.

EXAMPLE 31

A. Preparation of (1,3,5-Hexatrienyloxy)isopropyldimethylsilane

A 500 mL flask, fitted with a magnetic stirrer, an addition funnel, a thermocouple, and a reflux condenser connected to a nitrogen bubbler was charged with 0.50 g of zinc chloride, 72.4 mL of triethylamine (52.6 g, 0.51M, distilled from CaH$_2$), 58.6 mL of distilled 2,4-hexadienal (51.0 g, 0.531M), and 70 mL of toluene (distilled from Na). 79.0 mL of isopropyldimethylchlorosilane (69.0 g, 0.504M) was added via the addition funnel and the resulting reaction mixture was heated slowly to 63° and maintained at about this temperature for 6 hours and 50 minutes.

The reaction mixture was worked up according to a procedure similar to that described in Example 22A to give 45.52 g of (1,3,5-hexatrienyloxy)isopropyldimethylsilane (44%) distilling at 56.8°-/0.30 mm (40 Pa) to 64.6°-/0.65 mm (87 Pa). The $^1$H NMR spectrum (90 mHz) of this material was essentially the same as that of (1,3,5-hexatrienyloxy)trimethylsilane described in Example 22, except that it contained resonances peculiar to the isopropyldimethylsilyl group instead of the trimethylsilyl resonance. The infrared spectrum (KBr) contained bands at 3080 and 3030 cm$^{-1}$ (=CH), 2960, 2890 and 2870 cm$^{-1}$ (sat. CH), 1640 and 1585 cm$^{-1}$ (conj. C=C), 1255 and 840 cm$^{-1}$ (Si—CH$_3$), and 1185 cm$^{-1}$ (unsat. Si—O—C), and is consistent with the hexatrienyloxysilane structure.

B. Copolymerization of (1,3,5-Hexatrienyloxy)isopropyldimethylsilane and (Ethenyloxy)t-butyldimethylsilane (1:3) initiated by benzaldehyde in the presence of zinc iodide An apparatus similar to that described in Example 22B was charged with anhydrous zinc iodide (0.10 g, 0.31 mmol), methylene chloride (25 mL), and benzaldehyde (0.10 mL, 1.0 mmol). A well-mixed solution of (1,3,5-hexatrienyloxy)isopropyldimethylsilane (10.3 mL, 8.2 g, 48.8 mmol) and (ethenyloxy)t-butyldimethylsilane (25.0 mL, 19.9 g, 126 mmol) was added dropwise via the dropping funnel over a period of 31 minutes. The resulting mixture was stirred at ambient temperature for about 2.5 days.

The resulting viscous reaction mixture was worked up according to a procedure similar to that described in Example 25 to give a solid colorless polymer. The polymer was isolated, rinsed with fresh methanol and dried in a vacuum at 35°-40° oven to give 27.5 g of product (97%).

The infrared spectrum (KBr) of the product contained bands at 3020 cm$^{-1}$ (=CH), 2960, 2930, 2900 and 2860 cm$^{-1}$ (sat. CH), 1660 and 1620 cm$^{-1}$ (weak-in the conj. C=C region), 1255 and 835 cm$^{-1}$ (Si—CH$_3$), and 1075 cm$^{-1}$ (sat. Si—O—C). The $^1$H NMR spectrum (CDCl$_3$) contained resonances in the unsaturated CH region due to the hexatriene residues in the polymer, and a comparison of the intensities of these resonances to those of other resonances in the spectrum suggested that there are about 2.7 ethenyl residues for each hexatriene residue in the polymer.

What is claimed is:

1. Polymer consisting essentially of 2 to 100 mole percent of a first recurring unit of the formula

and 0 to 98 mole percent of a second recurring unit of the formula

wherein,

R$^1$ is independently selected from the group consisting of alkyl radicals having 1 to 10 carbon atoms, alkenyl radicals having about 2 or 4–10 carbon atoms, and aryl, aralkyl, and alkaryl radicals having 6 to 10 carbon atoms;

R$^9$ is independently selected from the group consisting of H and alkyl radicals having 1 to 6 carbons atoms, provided that adjacent R$^9$ groups are not both alkyl radicals; and n is an integer from 1 to 5, inclusive.

2. Polymer of claim 1, wherein each polymeric chain is terminated at one end by a —CHO group.

3. Polymer of claim 2, wherein each CHO—terminated polymeric chain is capped by a capping agent which is an aldehyde-reactive compound, said agent optionally containing at least one functional substituent that is unreactive under capping conditions.

4. Polymer prepared by hydrogenating the polymer of claim 1.

5. Polymer prepared by hydrolyzing the polymer of claim 1.

6. Process for preparing the polymer of claim 1, comprising:

contacting one or more monomers of the formula

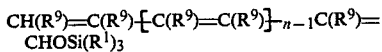

and, optionally, one or more monomers of the formula

under polymerizing conditions with a catalyst which is a Lewis acid, wherein $R^1$ is independently selected from the group consisting of alkyl radicals having 1 to 10 carbon atoms, alkenyl radicals having 2 or 4–10 carbon atoms, and aryl, aralkyl, and alkaryl radicals having 6 to 10 carbon atoms;

$R^9$ is independently selected from the group consisting of H and alkyl radicals having 1 to 6 carbon atoms, provided that adjacent $R^9$ groups are not both alkyl radicals; and n is an integer from 1 to 5, inclusive.

7. Process for preparing the polymer of claim 2, comprising:
contacting one or more monomers of the formula

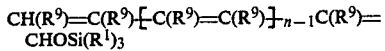

and, optionally, one or more monomers of the formula

under polymerizing conditions with a catalyst which is a suitable Lewis acid and an initiator which is an aldehyde or an aldehyde precursor compound thereof, wherein, $R^1$ is independently selected from the group consisting of alkyl radicals having 1 to 10 carbon atoms, alkenyl radicals having having 2 or 4–10 carbon atoms, and aryl, aralkyl, and alkaryl radicals having 6 to 10 carbon atoms;

$R^9$ is independently selected from the group consisting of H and alkyl radicals having 1 to 6 carbon atoms, provided that adjacent $R^9$ groups are not both alkyl radicals; and n is an integer from 1 to 5, inclusive.

8. Process of claim 7 wherein the aldehyde is of the formula

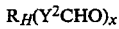

wherein, in the formulas:

$R_H$ is H or a hydrocarbyl radical of valence x which may be an alkyl, cycloalkyl, aryl, alkaryl or aralkyl radical having up to 20 carbon atoms, or a polymeric radical having at least 20 carbon atoms, and which, optionally, may contain ether oxygen and/or one or more functional substituents which are unreactive under polymerizing conditions;

x is an integer and is at least 1;

$Y^2$ is $y^3(C[R^4]_2)_y$;

$Y^3$ is a connecting bond or a divalent radical selected from —C(O)—, —$R^2$—, —N($R^3$)CH$_2$—, —CH(L$^1$)—, —CH(L$^2$)CH$_2$—, —CH(L$^3$)—(CH$_2$)$_a$—C(O)— and

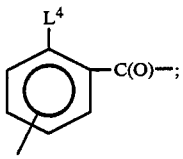

wherein $R^2$ is an alkylene radical having 1 to 10 carbon atoms or an aralkylene radical having 7 to 20 carbon atoms;

$R^3$ is an alkyl radical having 1 to 4 carbon atoms;

each $R^4$ is independently selected from H, $C_{1-10}$ alkyl and $C_{6-10}$ aryl, aralkyl or alkaryl;

$L^1$ is —OR$^5$, —OR$^6$OSi(R$^1$)$_3$ or —OSi(R$^1$)$_3$;

$R^5$ is an alkyl radical having 1 to 4 carbon atoms and $R^6$ is an alkylene radical having 1 to 4 carbon atoms;

$L^2$ is —OSi(R$^1$)$_3$; $L^3$ is —(CH$_2$)$_b$—C(O)OSi(R$^1$)$_3$; $L^4$ is —C(O)OSi(R$^1$)$_3$;

each of a and b, independently, is 0, 1 or 2; y is 0 or 1; and each $R^1$ is independently selected from the group consisting of alkyl radicals having 1 to 10 carbon atoms, alkenyl radicals having 2 or 4–10 carbon atoms, and aryl, aralkyl and alkaryl radicals having 6 to 10 carbon atoms.

9. Process of claim 8, wherein the aldehyde precursor compound is of the formula

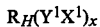

wherein $Y^1$ is a connecting bond or a divalent radical selected from —C(O)—, —$R^2$—, —CH[OSi($R^1$)]$_3$—, —CH(OR$^5$)— and —N⊕($R^3$)=CH$_2$, $Y^1$ and $X^1$ taken together is

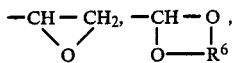

or

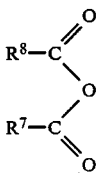

wherein $R^6$ is an alkylene radical having 1 to 4 carbon atoms, $R^8$ is a connecting bond or an alkylene radical having 1 to 10 carbon atoms, and $R^7$ is an alkyl radical having 1 to 10 carbon atoms or an aryl radical having 6 to 10 carbon atoms, or $R^8$ and $R^7$ taken together is

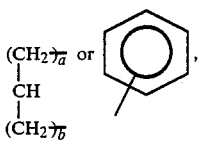

wherein each of a and b, independently, is 0, 1 or 2;
$X^1$ is —OH, —Cl, —Br, —H, —$R^5$, —$OR^5$, $Cl^\ominus$, $Br^\ominus$, $I^\ominus$, $O^\ominus R^5$, $O^\ominus COR^5$, or $CH_3C_6H_4SO_3^\ominus$;
with the provisos that:
(i) when $Y^1$ is a connecting bond, $X^1$ is —OH;
(ii) when $Y^1$ is —C(O)—, $X^1$ is —Cl, —Br, —H, or —$R^5$;
(iii) when $Y^1$ is —$R^2$—, $X^1$ is —Cl or —Br; and
(iv) when $Y^1$ is —$N^\oplus(R^3)$=$CH_2$, $X^1$ is $O^\ominus R^5$, $O^\ominus COR^5$, $Cl^\ominus$, $Br^\ominus$, $I^\ominus$, or $CH_3C_6H_4SO_3^\ominus$.

10. Process of claim 9 wherein $Y^1$ is a connecting bond, —C(O)—, —CH($OR^5$)— or —$R^2$— and $X^1$ is —OH, —Cl, —Br or —$OR^5$.

11. Polymer of claim 3 wherein the capping agent is a silyl ketene acetal, silyl enol ether, silyl ketene imine or a keto form thereof, of the formula $(R^1)_3SiQ^1R_p$ wherein
$R^1$ is independently selected from the group consisting of alkyl radicals having 1 to 10 carbon atoms, alkenyl radicals having having 2 or 4–10 carbon atoms, and aryl, aralkyl, and alkaryl radicals having 6 to 10 carbon atoms;
$Q^1$ is an enoxy or enimino diradical, or keto form thereof; and
$R_p$ is H, an alkyl radical having 1 to 4 carbon atoms, or a (meth)acrylic polymeric radical.

12. Polymer of claim 11 wherein $R_p$ is a (meth)acrylic polymeric radical.

13. Polymer of claim 3 wherein the capping agent contains at least one functional substituent that is unreactive under capping conditions.

14. Polymer of claim 11 wherein the capping agent contains at least one functional substituent that is unreactive under capping conditions.

15. Process for polymerizing one or more monomers of the formula

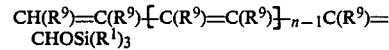

and optionally one or more monomers of the formula

wherein
$R^1$ is independently selected from the group consisting of alkyl radicals having 1 to 10 carbon atoms, alkenyl radicals having 2 or 4–10 carbon atoms, and aryl, aralkyl, and alkaryl radicals having 6 to 10 carbon atoms;
$R^9$ is independently selected from the group consisting of H and alkyl radicals having 1 to 6 carbon atoms, provided that adjacent $R^9$ groups are not both alkyl radicals; and
n is an integer from 1 to 5, inclusive;
said process comprising contacting the monomer or mixture of monomers under polymerizing conditions with a catalyst comprising a Lewis acid.

16. Process as defined in claim 15, wherein the monomer or mixture of monomers is contacted under polymerizing conditions with a catalyst comprising a Lewis acid and an initiator comprising an aldehyde or a aldehyde precursor compound thereof.

17. Polymer prepared according to the process of claim 15.

18. Polymer prepared according to the process of claim 16.

* * * * *